(12) United States Patent
Higashibeppu

(10) Patent No.: US 9,594,446 B2
(45) Date of Patent: Mar. 14, 2017

(54) INFORMATION PROCESSING DEVICE THAT DETERMINES OPERATIONAL MODE BASED ON USER'S TOUCH

(71) Applicant: Satoshi Higashibeppu, Kanagawa (JP)

(72) Inventor: Satoshi Higashibeppu, Kanagawa (JP)

(73) Assignee: NEC Corporation, Tokyo (JP)

( * ) Notice: Subject to any disclaimer, the term of this patent is extended or adjusted under 35 U.S.C. 154(b) by 2 days.

(21) Appl. No.: 14/364,381

(22) PCT Filed: Dec. 19, 2012

(86) PCT No.: PCT/JP2012/082867
§ 371 (c)(1),
(2) Date: Jun. 11, 2014

(87) PCT Pub. No.: WO2013/094624
PCT Pub. Date: Jun. 27, 2013

(65) Prior Publication Data
US 2014/0340342 A1    Nov. 20, 2014

(30) Foreign Application Priority Data

Dec. 19, 2011 (JP) .................................. 2011-276941

(51) Int. Cl.
*G06F 3/041* (2006.01)
*H04M 1/725* (2006.01)
*G06F 3/044* (2006.01)

(52) U.S. Cl.
CPC .............. *G06F 3/041* (2013.01); *G06F 3/044* (2013.01); *G06F 3/0416* (2013.01); *H04M 1/72569* (2013.01); *H04M 2250/22* (2013.01)

(58) Field of Classification Search
CPC    G06F 3/041; G06F 3/045; G06F 3/02; G09G 5/00; G09G 5/08
(Continued)

(56) References Cited

U.S. PATENT DOCUMENTS

2008/0284753 A1\* 11/2008 Hsu ...................... G06F 3/0416
345/174
2009/0120695 A1\* 5/2009 Liu ......................... G06F 3/038
178/18.03
(Continued)

FOREIGN PATENT DOCUMENTS

EP    2113826 A2    11/2009
JP    2003-271310 A    9/2003
(Continued)

OTHER PUBLICATIONS

International Search Report, Corresponding to PCT/JP2012/082867, Apr. 2, 2013, 2 pages.
(Continued)

*Primary Examiner* — Pegeman Karimi
(74) *Attorney, Agent, or Firm* — Wilmer Cutler Pickering Hale and Dorr LLP

(57) ABSTRACT

Input unit (120) detects contact with or approach of an object. Based on a result of the detection of input unit (120), mode setting unit (130) sets the operation mode of information processing device (100) to a first operation mode or a second operation mode. Control unit (140) performs control according to the operation mode set by mode setting unit (130).

9 Claims, 7 Drawing Sheets

(58) Field of Classification Search
USPC .................... 345/168–174; 178/18.01–18.06
See application file for complete search history.

(56) References Cited

U.S. PATENT DOCUMENTS

| | | | |
|---|---|---|---|
| 2009/0219175 A1* | 9/2009 | Takashima | G06F 3/03547 341/20 |
| 2009/0227295 A1* | 9/2009 | Kim | G06F 3/016 455/566 |
| 2011/0050610 A1* | 3/2011 | Pearce | G06F 3/038 345/173 |
| 2011/0148668 A1* | 6/2011 | Li | G06F 3/0418 341/20 |
| 2012/0162105 A1* | 6/2012 | Sakurai | G06F 3/0488 345/173 |
| 2012/0306927 A1* | 12/2012 | Lee | G06F 3/041 345/660 |

FOREIGN PATENT DOCUMENTS

| | | |
|---|---|---|
| JP | 2008-033701 A | 2/2008 |
| JP | 2008-217704 A | 9/2008 |
| JP | 2009-176227 A | 8/2009 |
| JP | 2009-181232 A | 8/2009 |
| JP | 2009-212719 A | 9/2009 |
| JP | 2011-113186 A | 6/2011 |
| WO | WO-2011-015827 A1 | 2/2011 |
| WO | WO-2011-129109 A1 | 10/2011 |

OTHER PUBLICATIONS

Japanese Office Action issued by the Japan Patent Office for Application No. 2013-550298 dated Jul. 19, 2016 (4 pages).

* cited by examiner

Fig.2

|  | Control operation | |
|---|---|---|
| Operation mode / Control item | Normal mode | Glove mode |
| SINGLE TOUCH | SELECT/DETERMINE | MAGNIFY/REDUCE |
| MULTI-TOUCH | VALID | NO CONTROL |
| LONG-TIME TOUCH | NO CONTROL | SELECT/DETERMINE |
| LONG-TIME TOUCH AND MOVE | MOVE | SELECT/DETERMINE |
| DISPLAY SIZE | MEDIUM | LARGE |
| NUMBER OF DISPLAY ICONS | MEDIUM | SMALL |
| LUMINANCE | MEDIUM | BRIGHT |
| RING VOLUME | MEDIUM | LARGE |
| STRENGTH OF VIBRATION | MEDIUM | STRONG |
| INFORMATION INPUT METHOD | TOUCH INPUT | VOICE INPUT |
| DISPLAY CHANGE | NORMAL | PARTIALLY OMITTED |
| EDIT FUNCTION | VALID | INVALID (ONLY DISPLAY) |
| ⋮ | ⋮ | ⋮ |

INFORMATION PROCESSING DEVICE THAT DETERMINES OPERATIONAL MODE BASED ON USER'S TOUCH

CROSS-REFERENCE TO RELATED APPLICATIONS

The present application is a national stage application of International Application No. PCT/JP2012/0082867 entitled "Information Processing Device," filed on Dec. 19, 2012, which claims the benefit of priority from Japanese Patent Application No. 2011-276941, filed on Dec. 19, 2011, the disclosures of which are incorporated herein in their entirety by reference thereto.

TECHNICAL FIELD

The present invention relates to an information processing device, an information processing method, and a program for processing information.

BACKGROUND ART

Recently, there have been placed on the market many information processing devices as exemplified by portable terminals on which a display having a touch panel function is mounted.

Moreover, technology has been recently developed which can vary the sensitivity of the touch sensor of a touch panel to distinguish between touch operations by a bare hand and touch operations by a gloved hand (e.g., refer to Patent Literature 1).

CITATION LIST

Patent Literature 1: JP2008-033701A

SUMMARY OF INVENTION

Problems to be Solved

A difference in the accuracy between a touch operation performed by a bare hand and a gloved hand that make contact with a touch panel has been generated. For example, in the case of the bare hand, a fine touch operation can be performed. On the other hand, in the case of the gloved hand, there is a problem in that a fine touch operation is difficult.

The technology described in Patent Literature 1 is designed only to change the sensitivity of the sensor, not to facilitate the operation in the case of the gloved hand.

It is therefore an object of the present invention to provide an information processing device, an information processing method, and a program that solve the aforementioned problem.

Solution to Problem

According to the present invention, an information processing device includes:
an input unit that detects contact with or approach of an object;
a mode setting unit that sets, based on a result of the detection of the input unit, the operation mode of the information processing device to a first operation mode or a second operation mode; and
a control unit that performs control according to the operation mode set by the mode setting unit.

According to the present invention, an information processing method implemented by an information processing device includes:
processing for detecting contact with or approach of an object;
processing for setting, based on the result of the detection, the operation mode of the information processing device to a first operation mode or a second operation mode; and
processing for controlling the information processing device according to the set operation mode.

According to the present invention, a program for causing an information processing device to execute:
a procedure for detecting contact with or approach of an object;
a procedure for setting, based on the result of the detection, the operation mode of the information processing device to a first operation mode or a second operation mode; and
a procedure for performing control according to the set operation mode.

Effects of Invention

As described above, according to the present invention, even in the case of a gloved hand that touches the touch panel, information can be accurately input easily.

BRIEF DESCRIPTION OF DRAWINGS

FIG. 2 A diagram showing an example of correspondence between an operation mode and a control operation stored in a table shown in FIG. 1.

DESCRIPTION OF EMBODIMENTS

Hereinafter, the embodiments of the present invention will be described with reference to the drawings.

Figure 1:
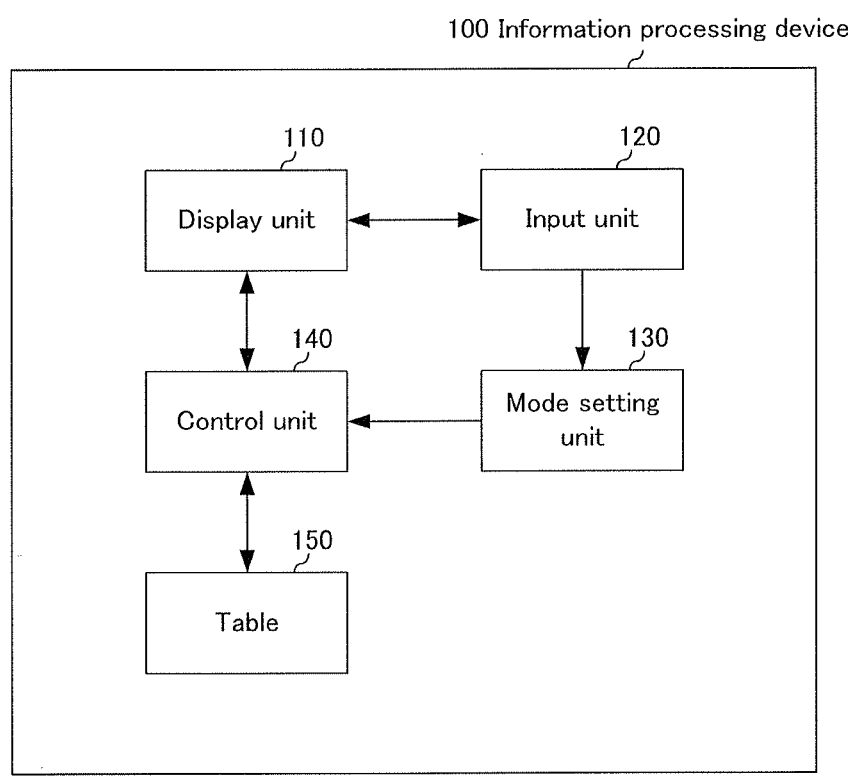
FIG. 1 A diagram showing an information processing device according to the embodiment of the present invention.

FIG. 1 is a diagram showing an information processing device according to the embodiment of the present invention.

As shown in FIG. 1, information processing device 100 according to the embodiment includes display unit 110, input unit 120, mode setting unit 130, control unit 140, and table 150.

Display unit 110 is a general display that displays information based on an instruction from control unit 140. Display unit 110 can be a touch panel that has the detection function of input unit 120.

Input unit 120 inputs information according to contact with or approach of an object as in the case of the touch panel.

Input unit 120 has a function of detecting contact with or approach of an object (user's finger or the like) to the display surface of display unit 110. For example, input unit 120 can include a contact sensor in the case of detecting contact with the object. Input unit 120 can include a proximity sensor in the case of detecting the approach of the object. Input sensor 120 detects contact with or approach of an object according to the change of capacitance between the object and the display surface when the object comes into contact or approaches.

Input unit 120 measures, when the object comes into contact or approaches, the resistance value of the object, and outputs the resistance value that is the measurement result to mode setting unit 130. Input unit 120 can measure other electric characteristics such as a current value in place of the resistance value, and output a measured numerical value as a measurement result to mode setting unit 130.

Mode setting unit 130 sets the operation mode of information processing device 100 to a normal mode (first operation mode) or a glove mode (second operation mode) based on the resistance value (current value) output from input unit 120.

For example, mode setting unit 130 sets the operation mode to the normal mode when the resistance value output from input unit 120 is equal to or lower than a preset threshold value. Mode setting unit 130 sets the operation mode to the glove mode when the resistance value output from input unit 120 is higher than the preset threshold value. Similarly, when the measurement result output from input unit 120 is a numerical value indicating other electric characteristics, mode setting unit 130 sets the operation mode based on a comparison with the threshold value.

Mode setting unit 130 can set the operation mode of information processing device 100 to a normal mode or a glove mode based on a predetermined input from the outside. The predetermined input can be selected from a menu displayed on display unit 110 by a user, or by pressing a predetermined button key disposed in information processing device 100. There are no particular restrictions.

Control unit 140 performs control according to an operation mode set by mode setting unit 130. A control operation when the normal mode is set and a control operation when the glove mode is set are stored beforehand in table 150. Accordingly, control unit 140 reads a control operation corresponding to the operation mode set by mode setting unit 130 from table 150, and performs control based on the read control operation.

FIG. 2 is a diagram showing an example of correspondence between an operation mode and a control operation stored in table 150 shown in FIG. 1.

As shown in FIG. 2, table 150 shown in FIG. 1 stores control operations corresponding to the respective operation modes (normal mode and glove mode).

For example, as shown in FIG. 2, concerning the control item "SINGLE TOUCH", the operation mode "NORMAL MODE" and the control operation "SELECT/DETERMINE" are associated with each other, and the operation mode "GLOVE MODE" and the control operation "MAGNIFY/REDUCE" are associated with each other. This means that when the operation mode is the normal mode, the control operation that control unit 140 performs, by a single touch, an operation to select/determine information. And this means that when the operation mode is the glove mode, the control operation that control unit 140 performs, by a single touch, operation to magnify/reduce information. The "TOUCH" indicates that input unit 120 has detected contact with or approach of the object (similar in description below).

Specifically, in the case in which the operation mode is the normal mode, when input unit 120 detects the approach of or proximity of the object to display unit 110, input unit 120 notifies control unit 140 of the position for detecting the approach of or the proximity of the object to display unit 110. Control unit 140 then executes processing to select/determine information (e.g., icon) displayed at the position. On the other hand, in the case in which the operation mode is the glove mode, when input unit 120 detects the approach of or the proximity of the object to display unit 110, input unit 120 notifies control unit 140 of the position for detecting the approach of or the proximity of the object to display unit 110. Control unit 140 then executes processing to magnify/reduce information (e.g., icon) displayed at the position.

Concerning the control item "MULTI-TOUCH", the operation mode "NORMAL MODE" and the control operation "VALID" are associated with each other, and the operation mode "GLOVE MODE" and the control operation "NO CONTROL" are associated with each other. This means that when the operation mode is the normal mode, the control operation of control unit 140 for the multi-touch (plurality of simultaneous touching operations) is valid. And this means that when the operation mode is the glove mode, the control operation of control unit 140 for the single touch means no control operation. In other words, concerning the multi-touch, preset control is performed in the normal mode, while no control is performed in the glove mode (control performed in normal mode is invalidated).

Concerning the control item "LONG-TIME TOUCH", the operation mode "NORMAL MODE" and the control operation "NO CONTROL" are associated with each other, and the operation mode "GLOVE MODE" and the control operation "SELECT/DETERMINE" are associated with each other. This means that when the operation mode is the normal mode, the control operation that control unit 140 performs for a touching operation that takes a long-time equal to or longer than the preset time means that no control is executed. And this means that when the operation mode is the glove mode, the control operation that control unit 140 performs for a touching operation that takes a long-time is an operation to select/determine inforamtion. In other words, concerning the long-time touch, preset control is performed in the glove mode, while no control is performed in the normal mode (control performed in glove mode is invalidated). Specifically, in the case in which the operation mode is the normal mode, when input unit 120 detects a long-time approach or proximity of the object to display unit 110, input unit 120 notifies control unit 140 of the position for detecting the approach of or the proximity of the object to display unit 110. Control unit 140 then executes processing to select/determine information (e.g., icon) displayed at the position.

Concerning the control item "LONG-TIME TOUCH AND MOVE", the operation mode "NORMAL MODE" and the control operation "MOVE" are associated with each other, and the operation mode "GLOVE MODE" and the control operation "SELECT/DETERMINE" are associated with each other. This means that when the operation mode is the normal mode, the control operation that control unit 140 performs when the position of touch moves by a preset distance or more after long-time touch for a predetermined time or more is control of movement. And this means that when the operation mode is the glove mode, the control that control unit 140 performs when the position of touch moves by a preset distance or more after long-time touch is an operation to select/determine information. Specifically, in the case in which the operation mode is the normal mode, when input unit 120 detects the approach or proximity and move of the object, over a long period, to display unit 110, input unit 120 notifies control unit 140 of the position for detecting the approach of or the proximity of the object to display unit 110. Control unit 140 then executes processing to move information (e.g., icon) displayed at the position. On the other hand, in the case that the operation mode is the glove mode, when input unit 120 detects the approach or proximity and move of the object, over a long period, to display unit 110, input unit 120 notifies control unit 140 of the position for detecting the approach of or the proximity of the object to display unit 110. Control unit 140 then executes processing to select/determine information (e.g., icon) displayed at the position.

Concerning the control item "DISPLAY SIZE", the operation mode "NORMAL MODE" and the control operation "MEDIUM" are associated with each other, and the operation mode "GLOVE MODE" and a control operation "LARGE" are associated with each other. This means that when the operation mode is the normal mode, the size of an icon or a menu that display unit 110 is caused to display by control unit 140 is around medium. And this means that when the operation mode is the glove mode, the size of an icon or a menu that display unit 110 is caused to display by control unit 140 is large. "MEDIUM" and the "LARGE" are expressions for convenience. There is no particular restriction on the level of the "MEDIUM" or the level of "LARGE". It is only required that the size of the icon or the menu that display unit 110 is caused to display by control unit 140 when the operation mode is the glove mode be larger than that of the icon or the menu that display unit 110 is caused to display by control unit 140 when the operation mode is the normal mode.

When the operation mode changes during display, a display size changes to correspond with the change. For example, when mode setting unit 130 changes the operation mode to the glove mode from a state where the operation mode is the normal mode, mode setting unit 130 notifies control unit 140 of this change. Control unit 140 reads a display size in the glove mode from table 150, and causes display unit 110 to perform displaying with a display size that is larger than a currently displayed display size. On the other hand, when mode setting unit 130 changes the operation mode to the normal mode from a state where the operation mode is the glove mode, mode setting unit 130 notifies control unit 140 of this change. Control unit 140 reads a display size in the normal mode from table 150, and causes display unit 110 to perform displaying with a display size that is smaller than a currently displayed display size.

Concerning the control item "NUMBER OF DISPLAY ICONS", the an operation mode "NORMAL MODE" and the control operation "MEDIUM" are associated with each other, and the operation mode "GLOVE MODE" and the control operation "SMALL" are associated with each other. This means that when the operation mode is the normal mode, the number of icons that display unit 110 is caused to display by control unit 140 is around medium. And this means that when the operation mode is the glove mode, the number of icons that display unit 110 is caused to display by control unit 140 is small. The "MEDIUM" and the "SMALL" are expressions for convenience. There is no particular restriction on the level of the "MEDIUM" or the level of "SMALL". It is only required that the number of icons that display unit 110 is caused to display by control unit 140 when the operation mode is the glove mode be smaller than that of icons that display unit 110 is caused to display by control unit 140 when the operation mode is the normal mode.

When the operation mode changes during display, the number of display icons changes correspondingly with the change. For example, when mode setting unit 130 changes the operation mode to the glove mode from a state where the operation mode is the normal mode, mode setting unit 130 notifies control unit 140 of this change. Control unit 140 reads the number of display icons in the glove mode from table 150, and causes display unit 110 to display the number of icons that is smaller than the number of currently displayed icons. On the other hand, when mode setting unit 130 changes the operation mode to the normal mode from a state where the operation mode is the glove mode, mode setting unit 130 notifies control unit 140 of this change. Control unit 140 reads the number of display icons in the normal mode from table 150, and causes display unit 110 to display the number of icons that is larger than that of currently displayed icons.

Concerning the control item "LUMINANCE", the operation mode "NORMAL MODE" and a control operation "MEDIUM" are associated with each other, and the operation mode "GLOVE MODE" and the control operation "BRIGHT" are associated with each other. This means that when the operation mode is the normal mode, control unit 140 controls the display brightness of display unit 110 to be around medium. And this means that when the operation mode is the glove mode, control unit 140 controls the display brightness of display unit 110 to be bright. The "MEDIUM" and the "BRIGHT" are expressions for convenience. There is no particular restriction on the level of the "MEDIUM" or the level of "BRIGHT". It is only required that the display brightness of display unit 110 when the operation mode is the glove mode be brighter than that of display unit 110 when the operation mode is the normal mode.

When the operation mode changes during display, luminance changes correspondingly with the change. For example, when mode setting unit 130 changes the operation mode to the glove mode from a state where the operation mode is the normal mode, mode setting unit 130 notifies control unit 140 of this change. Control unit 140 reads luminance in the glove mode from table 150, and controls display brightness of display unit 110 to be brighter than current brightness. On the other hand, when mode setting unit 130 changes the operation mode to the normal mode from a state where the operation mode is the glove mode, mode setting unit 130 notifies control unit 140 of this change. Control unit 140 reads luminance in the normal mode from table 150, and controls display brightness of display unit 110 to be darker than current brightness.

Concerning the control item "RING VOLUME", the operation mode "NORMAL MODE" and a control operation "MEDIUM" are associated with each other, and the operation mode "GLOVE MODE" and the control operation "LARGE" are associated with each other. This means that when the operation mode is the normal mode, control unit 140 controls the ring volume to be around medium. And this means that when the operation mode is the glove mode, control unit 140 controls the ring volume to be large. The "MEDIUM" and the "LARGE" are expressions for convenience. There is no particular restriction on the level of the "MEDIUM" or the level of "LARGE". It is only required that the size of the ring volume controlled by control unit 140 when the operation mode is the glove mode be larger than that of the ring volume controlled by control unit 140 when the operation mode is the normal mode.

When the operation mode changes during display, the ring volume changes correspondingly with the change. For example, when mode setting unit 130 changes the operation mode to the glove mode from a state where the operation mode is the normal mode, mode setting unit 130 notifies control unit 140 of this change. Control unit 140 reads the ring volume in the glove mode from table 150, and controls the ring volume to be larger than the current volume. On the other hand, when mode setting unit 130 changes the operation mode to the normal mode from a state where the operation mode is the glove mode, mode setting unit 130 notifies control unit 140 of this change. Control unit 140 reads the ring volume in the normal mode from table 150, and controls the ring volume to be smaller than the current volume.

Concerning the control item "STRENGTH OF VIBRATION", the operation mode "NORMAL MODE" and the control Operation "MEDIUM" are associated with each other, and the operation mode "GLOVE MODE" and the control operation "STRONG" are associated with each other. This means that when the operation mode is the normal mode, control unit 140 controls the strength of the vibration to be around medium. And this means that when the operation mode is the glove mode, control unit 140 controls the strength of the vibration to be strong. The "MEDIUM" and the "STRONG" are expressions for convenience. There is no particular restriction on the level of the "MEDIUM" or the level of the "STRONG". It is only required that the strength of the vibration controlled by control unit 140 when the operation mode is the glove mode be stronger than that of the vibration controlled by control unit 140 when the operation mode is the normal mode. The example of the vibration has been described as means for providing tactile information. Not limited to the vibration, however, other tactile information providing means such as a haptics UI (User Interface) can be used.

When the operation mode changes during display, the strength of the vibration changes correspondingly with the change. For example, when mode setting unit 130 changes the operation mode to the glove mode from a state where the operation mode is the normal mode, mode setting unit 130 notifies control unit 140 of this change. Control unit 140 reads the strength of the vibration in the glove mode from table 150, and controls the strength of the vibration to be stronger than current strength. On the other hand, when mode setting unit 130 changes the operation mode to the normal mode from a state where the operation mode is the glove mode, mode setting unit 130 notifies control unit 140 of this change. Control unit 140 reads the strength of the vibration in the normal mode from table 150, and controls the strength of the vibration to be weaker than the current strength.

Concerning the control item "INFORMATION INPUT METHOD", the operation mode "NORMAL MODE" and the control operation "TOUCH INPUT" are associated with each other, and the operation mode "GLOVE MODE" and the control operation "VOICE INPUT" are associated with each other. This means that when the operation mode is the normal mode, control unit 140 controls the information input method by a touch input. And this means that when the operation mode is the glove mode, control unit 140 controls the information input method by a voice input.

Concerning the control item "DISPLAY CHANGE", the operation mode "NORMAL MODE" and the control operation "NORMAL" are associated with each other, and the operation mode "GLOVE MODE" and the control operation "PARTIALLY OMITTED" are associated with each other. This means that when the operation mode is the normal mode, the change of the screen that display unit 110 is caused to display by control unit 140 is normal. And this means that when the operation mode is the glove mode, the change of the screen that display unit 110 is caused to display by control unit 140 is partially omitted. Specifically, for example, when a mail icon is selected from a menu screen, in the normal mode, control unit 140 performs control to display a screen for selecting which of new mail creation and a received mail list is to be displayed next. In the glove mode, control unit 140 performs control to display a received mail list next when the mail icon is selected from the menu screen. Thus, in the glove mode when a user's operation is difficult, control unit 140 omits (skips) partial displaying.

Concerning the control item "EDIT FUNCTION", the operation mode "NORMAL MODE" and the control operation "VALID" are associated with each other, and the operation mode "GLOVE MODE" and the control operation "INVALID (ONLY DISPLAY)" are associated with each other. This means that when the operation mode is the normal mode, control unit 140 performs control to enable the editing of data after the data editing function has been activated. And this means that when the operation mode is the glove mode, data editing is disabled (invalidated) after activation of the function for editing data, and control unit 140 performs control to only enable the display of data. The detail of this processing is described after.

The control items shown in FIG. 2 are only some examples of control items executed by control unit 140. For the other control items executed by control unit 140, similarly, control operations according to the operation modes are stored beforehand in table 150.

Hereinafter, the information processing method in information processing device 100 shown in FIG. 1 will be described. An example where input unit 120 detects making contact with an object will be described.

Figure 3:
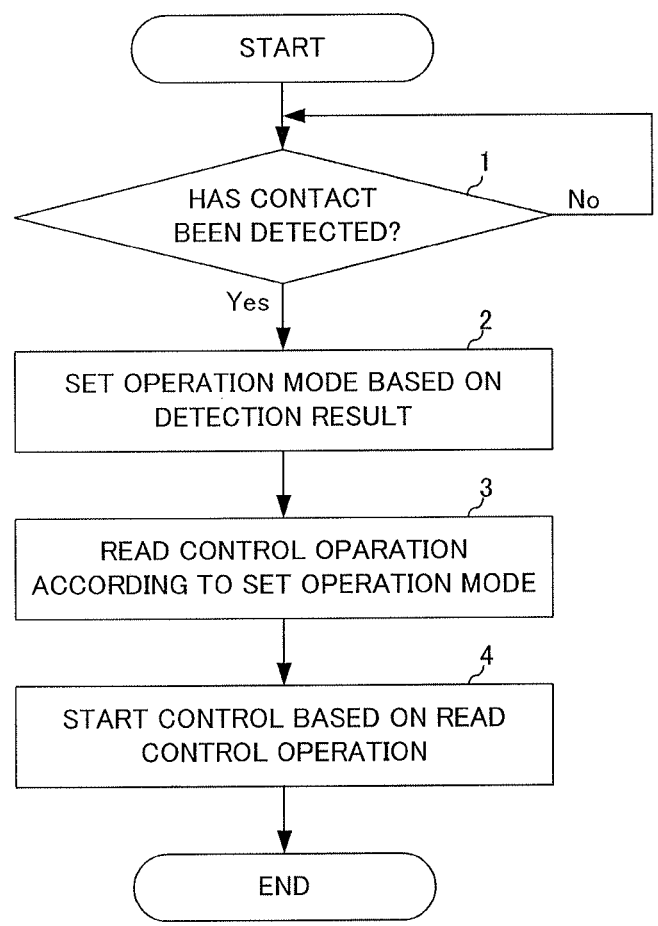
FIG. 3 A flowchart illustrating an information processing method in the information processing device shown in FIG. 1.

FIG. 3 is a flowchart illustrating the information processing method in information processing device 100 shown in FIG. 1.

First, in step 1, after input unit 120 detects making contact with an object, input unit 120 measures the resistance value of an object with which contact has been made, and outputs a resistance value that is the result of the measurement to mode setting unit 130.

Mode setting unit 130 compares the resistance value output from input unit 120 with a preset threshold value. Then, in step 2, mode setting unit 130 sets the operation mode of information processing device 100 to the normal mode or the glove mode based on the comparison result. For example, when the resistance value output from input unit 120 is equal to or less than the threshold value, mode setting unit 130 sets the operation mode of information processing device 100 to the normal mode. When the resistance value output from input unit 120 is higher than the threshold value, mode setting unit 130 sets the operation mode of information processing device 100 to the glove mode. Mode setting unit 130 notifies control unit 140 of the set operation mode.

Then, in step 3, control unit 140 reads a control operation according to the operation mode notified from mode setting unit 130 from table 150.

Then, in step 4, control unit 140 performs control based on the control operation read from table 150. For example, taking control items "DISPLAY SIZE" and "NUMBER OF DISPLAY ICONS" concerning displaying as examples, in the normal mode, the "DISPLAY SIZE" is controlled to be "MEDIUM" and the "NUMBER OF DISPLAY ICONS" is controlled to be "MEDIUM". In the glove mode, the "DIS- PLAY SIZE" is controlled to be "LARGE" and the "NUMBER OF DISPLAY ICONS" is controlled to be "SMALL".

Figure 4:
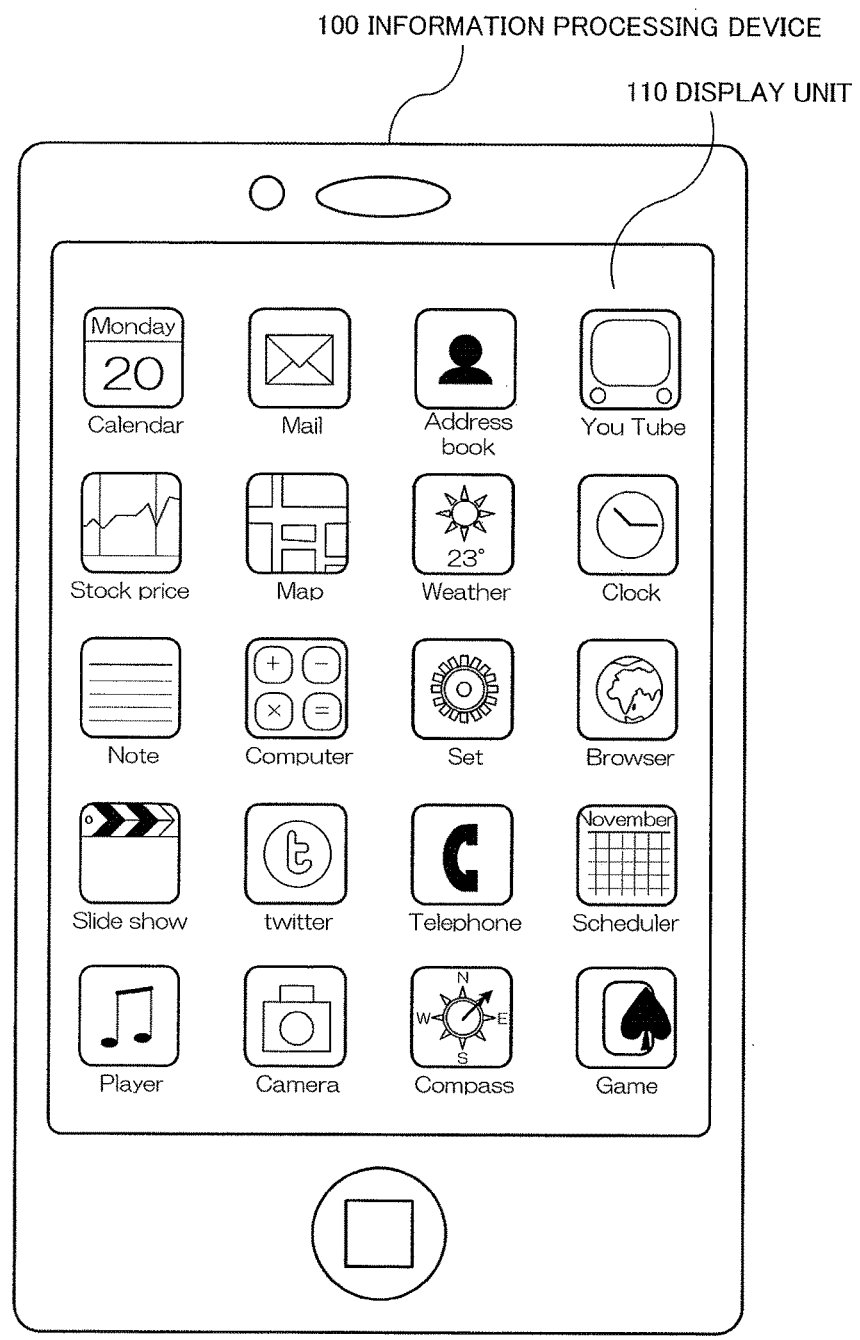
FIG. 4 A diagram showing an example of a menu screen displayed on a display unit when a normal mode is set.

FIG. 4 is a diagram showing an example of a menu screen displayed on display unit 110 when a normal mode is set.

Figure 5:
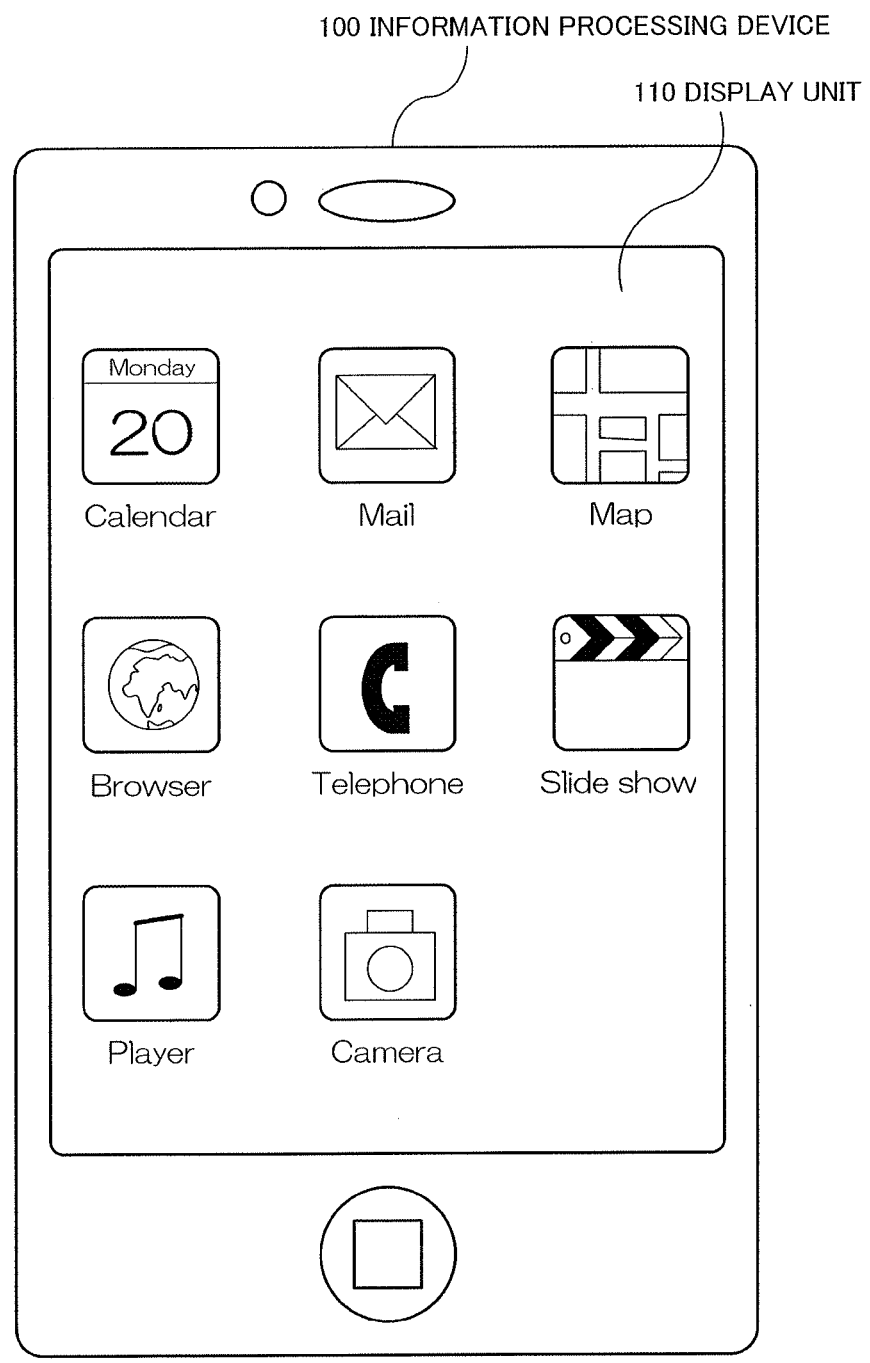
FIG. 5 A diagram showing an example of a menu screen displayed on the display unit when a glove mode is set.

FIG. 5 is a diagram showing an example of a menu screen displayed on display unit 110 when a glove mode is set.

When the menu screen shown in FIG. 4 and the menu screen shown in FIG. 5 are compared with each other, the size of the icon displayed on the menu screen shown in FIG. 5 is larger than that of an icon displayed on the menu screen shown in FIG. 4. The number of icons displayed on the menu screen shown in FIG. 5 is smaller than that of icons displayed on the menu screen shown in FIG. 4.

The number of icons displayed on the menu screen shown in FIG. 5 is smaller than that of icons displayed on the menu screen shown in FIG. 4. Accordingly, when the user uses the device in the glove mode, control is performed to display only an icon having a function that is used with a high frequency without displaying any icon having a function that is used with a low frequency. The icon (function) displayed in the glove mode can be set beforehand from the outside. The set icon is stored in table 150.

Thus, control unit 140 can cause display unit 110 to display an operation screen according to an operation mode set by mode setting unit 130.

As a result, in the glove mode, by changing a displayed menu configuration or the sizes or the number of display icons, an accurate touch operation that is difficult in the gloved hand state can be easily performed.

As described above, by setting high luminance on the display screen in the glove mode, in the outdoors where the hand is presumed to be gloved, the display screen can be viewed more easily even in a state where the surroundings are bright or when the user wears goggles or sunglasses.

As described above, by increasing the ring volume in the glove mode, in the outdoors (e.g., ski site) where the hand is presumed to be gloved, the user can be prevented from being unaware of an incoming call due to earmuffs worn by the user.

As described above, by increasing the strength of the vibration in the glove mode, the user can sense vibration even in a dull state set due to wearing of gloves.

As described above, by setting the information inputting method to a voice input in the glove state, the user can accurately input information that is difficult to be input by a touch operation in the gloved hand state.

As described above, by partially omitting the change of the display screen in the glove mode, the number of times in which it is difficult for a user to perform a touch operation using a gloved hand can be reduced.

Figure 6:
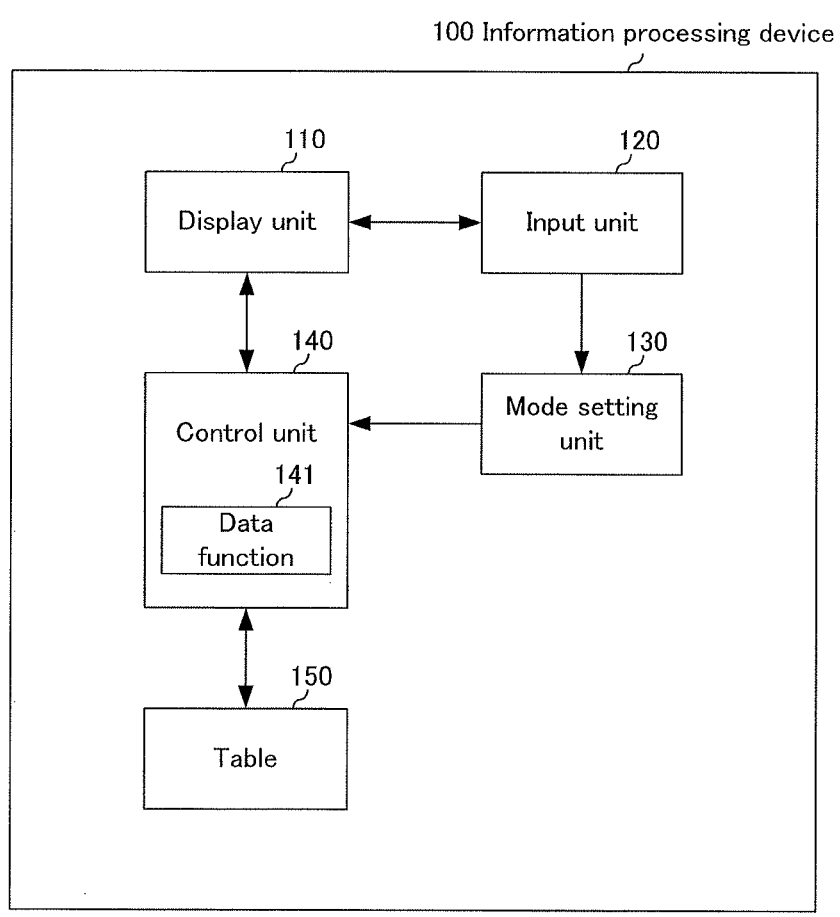
FIG. 6 A diagram showing an example of a detailed configuration of a control unit in the information processing device shown in FIG. 1.

FIG. 6 is a diagram showing an example of a detailed configuration of control unit 140 in information processing device 100 shown in FIG. 1.

As shown in FIG. 6, control unit 140 has data function 141.

Data function 141 includes a function for editing data stored in information processing device 100 based on an input from the outside, and a function for displaying the data on display unit 110. Normally (when normal mode is set), control unit 140 executes the data edit function and the data display function after data function 141 is activated.

On the other hand, when mode setting unit 130 sets the operation mode to the glove mode, control unit 140 executes the data display function after data function 141 is activated.

Hereinafter, processing when control unit 140 activates data function 141 will be described.

Figure 7:
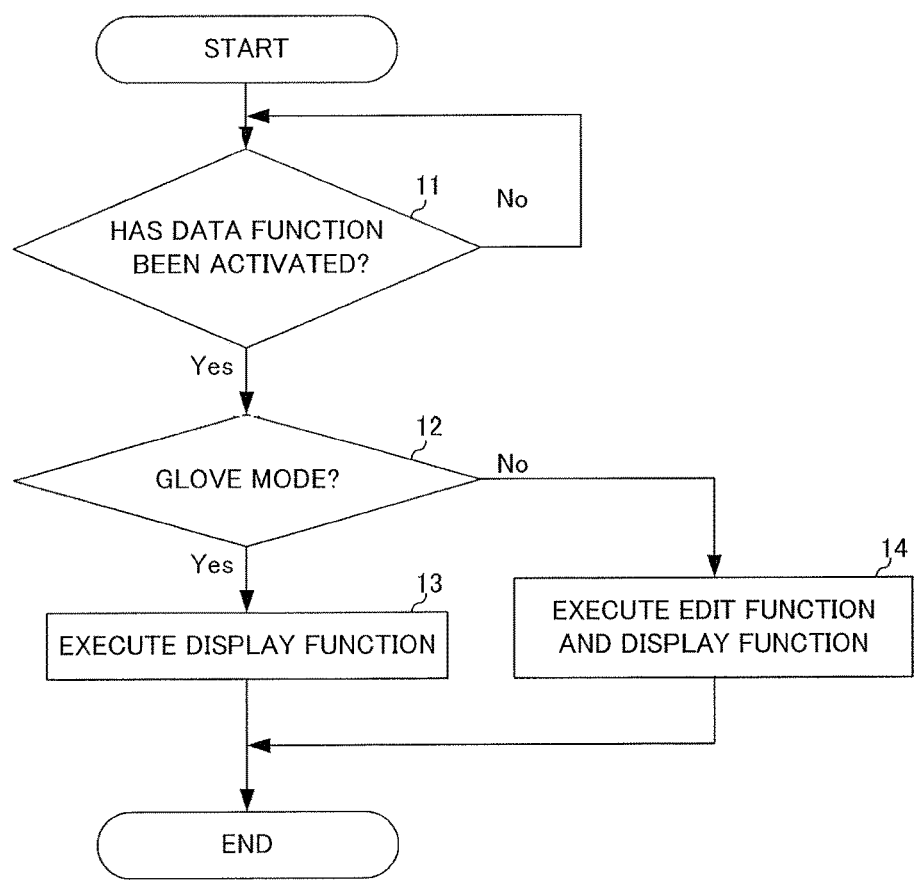
FIG. 7 A flowchart illustrating processing when the control unit shown in FIG. 6 activates a data function.

FIG. 7 is a flowchart illustrating processing when control unit 140 shown in FIG. 6 activates data function 141.

First, in step 11, determination is made as to whether or not control unit 140 has activated data function 141.

When it is determined that data function 141 has been activated, in step 12, control unit 140 determines whether or not the operation mode set by mode setting unit 130 is the glove mode.

When it is determined that the operation mode set by mode setting unit 130 is the glove mode, in step 13, control unit 140 executes the data display function from among the functions included in data function 141.

On the other hand, when it is determined that the operation mode set by mode setting unit 130 is not the glove mode, in other words, the operation mode set by mode setting unit 130 is the normal mode, in step 14, control unit 140 executes the data edit function and the data display function included in data function 141.

Thus, since an accurate touch operation is difficult in the glove mode, by executing only the display function via control unit 140, unintended editing caused by an erroneous input can be prevented.

The processing of each component disposed in information processing device 100 described above can be performed by a logical circuit prepared depending on the purpose. A computer program (hereinafter, referred to as program) describing processing contents as procedures can be recorded in a recording medium readable in information processing device 100, and the program recorded in the recording medium can be read by information processing device 100 to be executed. The recording medium readable in information processing device 100 is a movable recording medium such as a floppy (registered trademark) disk, a magneto-optical disk, a DVD or a CD, or a memory such as a ROM or a RAM or a HDD included in information processing device 100. The program recorded in the recording medium is read by control unit 140 disposed in information processing device 100, and processing similar to that described above is performed under control of control unit 140. In this case, control unit 140 operates as a computer that executes the program read from the recording medium recording the program.

The embodiments of the present invention have been described. However, the present invention is not limited to the embodiments. Various changes understandable to those skilled in the art can be made to the configuration and the specifics of the present invention without departing from the scope of the invention.

This application claims priority from Japanese Patent Application No. 2011-276941 filed Dec. 19, 2011, which is hereby incorporated by reference herein in its entirety.

The invention claimed is:

1. An information processing device comprising:
a memory for storing instructions; and
a processor configured to execute the instructions to:
detect contact with or approach of an object, wherein a resistance value of the object is measured when contact with or approach of the object is detected;
set, based on the measured resistance value, an operation mode of the information processing device to a first operation mode or a second operation mode, wherein the first operation mode is set when the information processing device is operated using a non-gloved hand that reduces the measured resistance value, and the second operation mode is set when the information processing device is operated using a gloved hand that increases the measured resistance value; and control according to the set operation mode,
wherein control of at least one of displayed information size, ring volume, and vibration strength is different based on whether the first operation mode or the second operation mode is set.

2. The information processing device according to claim 1, wherein when the operation mode is set to the second operation mode, control that is performed when a plurality of contacting or approaching operations is simultaneously detected in the case of the operation mode set to the first operation mode is invalidated.

3. The information processing device according to claim 1, wherein when the operation mode is set to the second operation mode, if contacting or approaching operations are detected for at least a predetermined time, control is performed that corresponds to the detection.

4. The information processing device according to claim 1, wherein when the operation mode is set to the second operation mode, if a position at which contact with or approach of an object is detected moves by a predetermined distance or more after detection of the contact with or the approach of an object for a predetermined time or more, control is performed that corresponds to the detection.

5. The information processing device according to claim 1, further comprising a display,
wherein the display is controlled to display an operation screen according to a set operation mode.

6. The information processing device according to claim 1, wherein the instructions further include a data function including a data edit function and a data display function, and wherein the processor executes, when the operation mode is set to the second operation mode, the data display function after activation of the data function.

7. The information processing device according to claim 1, wherein a table stores the first operation mode and the second operation mode and a control operation, that is performed when each of the operation modes is set, to place said first mode and said second mode in correspondence, and
the processor is configured to execute the instructions to read a control operation corresponding to a set operation mode from the table, and perform control based on the read control operation.

8. An information processing method implemented by an information processing device, the method comprising:
detecting contact with or approach of an object;
measuring a resistance value of the object when contact with or approach of the object is detected;
setting, based on the measured resistance value, an operation mode of the information processing device to a first operation mode or a second operation mode, wherein the first operation mode is set when the information processing device is operated using a non-gloved hand that reduces the measured resistance value, and the second operation mode is set when the information processing device is operated using a gloved hand that increases the measured resistance value; and
controlling the information processing device according to the set operation mode,
wherein at least one of displayed information size, ring volume and vibration strength is controlled differently based on whether the first operation mode or the second operation mode is set.

9. A recording medium storing a program for causing an information processing device to execute:
a procedure for detecting contact with or approach of an object;
a procedure for measuring a resistance value of the object when contact with or approach of the object is detected;
a procedure for setting, based on the measured resistance value, an operation mode of the information processing device to a first operation mode or a second operation mode, wherein the first operation mode is set when the information processing device is operated using a non-gloved hand that reduces the measured resistance value, and the second operation mode is set when the information processing device is operated using a gloved hand that increases the measured resistance value; and
a procedure for performing control according to the set operation mode,
wherein at least one of displayed information size, ring volume and vibration strength is controlled differently based on whether the first operation mode or the second operation mode is set.

* * * * *